S. THOMAS.
PROCESS OF PRODUCING LAMINATED CONSTRUCTIONS AND APPARATUS FOR USE IN CONNECTION THEREWITH.
APPLICATION FILED MAR. 21, 1917.
1,398,244.
Patented Nov. 29, 1921.
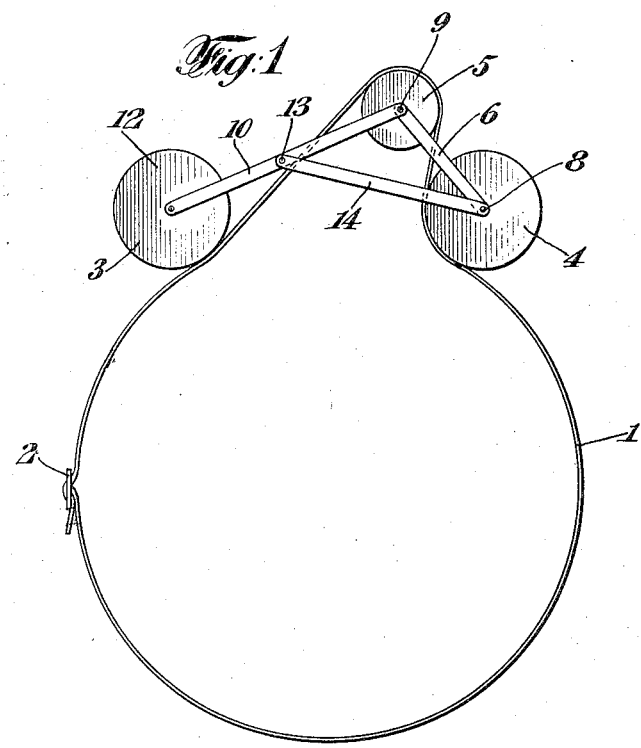
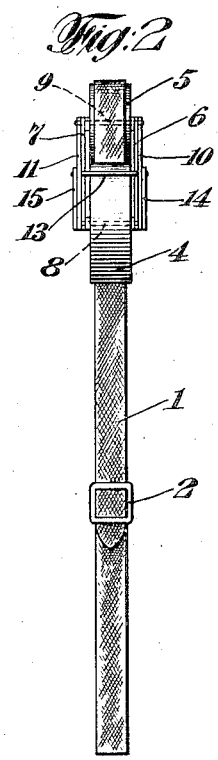
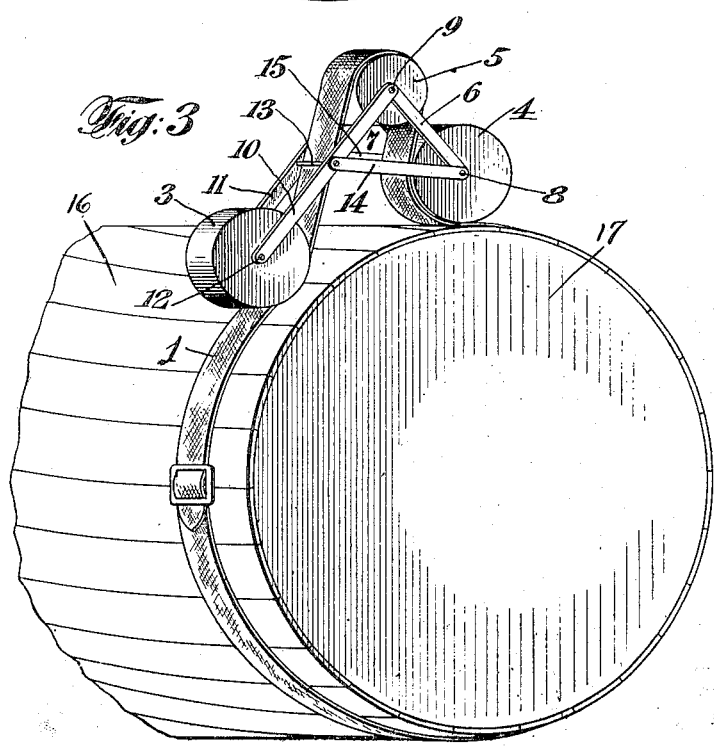
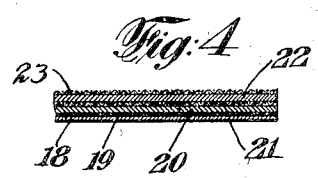
INVENTOR
Stephen Thomas
BY
Prindle, Wright & Small
ATTORNEYS

UNITED STATES PATENT OFFICE.

STEPHEN THOMAS, OF LONG ISLAND CITY, NEW YORK, ASSIGNOR, BY MESNE ASSIGNMENTS, TO L-W-F ENGINEERING COMPANY, INC., OF COLLEGE POINT, LONG ISLAND, NEW YORK, A CORPORATION OF NEW YORK.

PROCESS OF PRODUCING LAMINATED CONSTRUCTIONS AND APPARATUS FOR USE IN CONNECTION THEREWITH.

1,398,244.  Specification of Letters Patent.  Patented Nov. 29, 1921.

Application filed March 21, 1917. Serial No. 156,485.

*To all whom it may concern:*

Be it known that I, STEPHEN THOMAS, of Long Island City, in the county of Queens and in the State of New York, have invented a certain new and useful Improvement in Processes of Producing Laminated Constructions and Apparatus for Use in Connection Therewith, and do hereby declare that the following is a full, clear, and exact description thereof.

My invention relates particularly to a method of producing laminated constructions although it has application specially to the production of aeroplane fuselages and relates also to the apparatus to be used in connection therewith.

The object of my invention is to provide a method by means of which fuselages may be advantageously constructed with laminations at a minimum cost and with a minimum amount of labor.

A further object is to provide a method by which the laminations may be applied in such a way as to cause them to adhere tightly and uniformly to the adjacent parts.

A further object is to provide an apparatus for use in connection with the method above referred to.

Further objects of my invention will be apparent from the detailed description thereof contained hereinafter.

While my invention is capable of being carried out in many different ways for the purpose of illustration, I shall describe only one form of my invention and while my invention is capable of being carried out with many different forms of apparatus, for the purpose of illustration I have shown only one form thereof in the accompanying drawings, in which—

Figure 1 is a side elevation of an apparatus which may be used in accordance with my invention, which is shown before being applied to the fuselage;

Fig. 2 is an end elevation of the same;

Fig. 3 shows the same as applied to a fuselage; and

Fig. 4 is a cross-section of a laminated construction made according to my invention.

In the drawings I have shown an apparatus which is comprised of a band 1 of woven material having a buckle 2 thereon of any suitable character so as to secure the free ends together and permit the length of the band 1 to be decreased, or the band contracted, as desired. The band 1 is arranged so as to pass beneath two rollers 3 and 4 and over a small roller 5. The rollers 4 and 5 are connected together by a pair of short arms 6 and 7, the ends of which are arranged to support axles 8 and 9 for said wheels 4 and 5. The wheels 3 and 5 are connected together by long arms 10 and 11, which at one end are connected to the axle 9 and at the other end to an axle 12 for the wheel 3. Intermediate their ends the arms 10 and 11 are connected by a bar 13 and from this bar 13 two inclined cross bars 14 and 15 lead to the axle 8. The apparatus is so constructed in this manner as to provide an ample space between the wheels 3 and 4 where the band 1 is arched over or separated from the body of the fuselage while at the same time the roller 5 and the arms 14 and 15 are elevated and located partly to one side, so as to give ample room for inserting a strip of wood, and for the manipulation of a gluing brush to be used for applying the glue in the making of a fuselage 16. In making the fuselage 16 a mold or form 17 is first set up, said mold having the form which is desired to be given to the fuselage when completed. Upon the mold 17 there is placed a layer of wax paper 18. Upon this there is placed a layer of cloth 19 of any suitable character. Thin strips of wood 20 are then placed on the top of the layer of cloth 19 and are fitted together until the entire body of the fuselage is covered with the edges of the strips 20 fitting closely together and extending to some extent spirally around the mold 17. Thereupon a series of belts 1 with the rollers 3, 4 and 5 attached are applied to the fuselage at intervals of about four inches along the same; the buckles 2 being adjusted so as to tighten the belts 1 on the fuselage. The rollers 3, 4 and 5 upon each of the belts 1 are then shifted so that the spaces between the rollers 3 and 4 overlie a particular one of the strips 20. This strip 20 is then temporarily moved laterally away from its position on the fuselage and a coating of glue is thereupon applied with a brush to the part of the fuselage body from which the strip has been removed. The strip is then replaced on the glued surface and immediately thereafter all of the rollers 3, 4 and 5 attached to the several bands 1 are shifted as rapidly as possible so that the bands 1 then pass immediately over the glued strip so as to hold the same in place and press it in position uniformly before the glue has had an opportunity to chill along any portion of the strip. The adjacent strip 20 is then removed in a similar manner, glue is applied to the fuselage at the point where the strip has been removed, the strip is replaced and the rollers 3, 4 and 5 are again shifted to cover this strip. All of the strips 20 are glued in place in this manner until the entire surface of the fuselage has been covered. Thereupon the bands 1 are removed and a coating of glue is applied to the entire fuselage. After this a tape 21 of any suitable woven fabric, as for example Irish linen, is wound around the fuselage until the same is covered thereby. Then the fuselage has applied to it another series of wood strips 22, preferably arranged in a spiral direction opposite to the direction of the wooden strips 20, the edges of the strips 22 being fitted together until the fuselage is entirely covered thereby. Thereupon the bands 1 and attached rollers are again applied in the same manner as before described and said strips 22 are glued down in the manner which has already been described; then an additional coating of glue is applied, and thereafter a winding of tape 23 is provided on top of the glue in such a manner as to entirely cover the exterior of the fuselage. Any suitable coating material may be applied over the tape 23. Two layers of wood and two layers of tape over the same have been above described but it is to be understood that any number of such layers of wood and tape may be applied as may be found to be desirable. Thereafter the mold 17 may be removed and the fuselage completed. In this way the fuselage may be built up by securing the strips of wood in place one after another without giving the glue an opportunity to chill at any place along the particular strip before the strip is applied and clamped in place. Furthermore, very little labor is required in shifting the rollers 3, 4 and 5 so as to clamp the strips in place. Furthermore the clamping means is comprised of purely a surface binding so that the use of nails to secure the glued strips in place is avoided thus avoiding perforations in the strips which when present render the fuselage porous and consequently subject to the absorption of moisture and great shrinkage in drying, and avoiding damage to the mold by nails. As pointed out above the construction of the carriage comprising the rollers 3, 4 and 5 is such as to give ample room for the manipulation of the gluing brush beneath the same. The rollers 3 and 4 are preferably made large so as to obtain a high axial elevation between the same and the fuselage and the roller 5 is made small for the reason that the band 1 is more readily retained on the same than if the roller 5 were large.

While I have described my invention above in detail, I wish it to be understood that many changes can be made therein without departing from the spirit of my invention.

What I claim is:

1. The process which comprises applying an adhesive to the surface of a portion of a fuselage, placing a band having a shiftable arch around the fuselage, applying a strip to said surface within the arch of said band, and shifting the arch to place the pressure of the band on the strip.

2. The process of securing strips in place upon a body, which comprises placing a band having a shiftable arch around the body, applying a strip to the body within the arch, and shifting the arch to place the pressure of the band on the strip.

3. A clamping device comprising a band adapted to pass around a body, means for tightening the same, and means for maintaining an arch in said band to permit access to the portion of the body underneath said arch.

4. A clamping device comprising a band adapted to pass around a body, means for tightening the same, means for maintaining an arch in said band to permit access to the portion of the body underneath said arch, and means permitting shifting of said arch around the band.

5. A clamping device comprising a band, and means for maintaining a shiftable arch in the same, comprising a set of rollers.

6. A clamping device comprising a band, and means for maintaining a shiftable arch in the same, comprising two lateral rollers and one intermediate roller.

7. A clamping device comprising a band, and means for maintaining a shiftable arch in the same, comprising two lateral rollers and one intermediate roller, the intermediate roller being nearer to one than to the other of the lateral rollers.

8. A clamping device comprising a band, and means for maintaining a shiftable arch in the same, comprising two lateral rollers and one intermediate roller, the intermediate roller being nearer to one than it is to the other of the lateral rollers, and a set of arms connecting the rollers together.

9. A clamping device comprising, a band adapted to inclose a form, and means for providing an arched portion in said band to permit access to the part of the form underneath said arch.

10. A clamping device comprising, a band adapted to inclose a form, means for providing an arched portion in said band to permit access to the part of the form underneath said arch, and means to permit shifting the position of said arched portion.

11. A clamping device comprising, a band adapted to inclose a form, a pair of rollers supported over said band, and a third roller between the rollers of said pair having a support adapted to space the third roller from the form, said band passing over said last mentioned roller.

In testimony that I claim the foregoing I have hereunto set my hand.

STEPHEN THOMAS.

Witnesses:
FRANK J. BOSTWICK,
ARCHIBALD BLACK.